(12) United States Patent
Friedland et al.

(10) Patent No.: US 6,238,762 B1
(45) Date of Patent: May 29, 2001

(54) SELECTIVELY TEARABLE COVERING SHEET

(75) Inventors: Robert J. Friedland, Pasadena; Mark A. Calkins, Los Angeles, both of CA (US)

(73) Assignee: Kittrich Corp", La Mirada, CA (US)

( * ) Notice: Subject to any disclaimer, the term of this patent is extended or adjusted under 35 U.S.C. 154(b) by 0 days.

(21) Appl. No.: 09/389,569

(22) Filed: Sep. 3, 1999

(51) Int. Cl.[7] .................................................... B32B 3/10
(52) U.S. Cl. .......................... 428/43; 428/167; 428/169
(58) Field of Search ........................... 428/43, 163, 167, 428/169, 172; 283/105

(56) References Cited

U.S. PATENT DOCUMENTS

| | | | | |
|---|---|---|---|---|
| 3,143,208 | * | 8/1964 | Sizemore | 428/43 |
| 3,706,626 | * | 12/1972 | Smith et al. | 428/43 |
| 5,198,275 | * | 3/1993 | Klein | 428/43 |
| 6,007,886 | * | 12/1999 | Takigami | 428/43 |

* cited by examiner

Primary Examiner—Alexander S. Thomas
(74) Attorney, Agent, or Firm—D. W. Eggins

(57) ABSTRACT

A covering sheet for applying to a selected surface in substantially fitted, covering relation consists of a flexible sheet of predetermined size and thickness, having a rectangular grid of lines to provide rectilinear yield lines (lines of weakness) extending in a first direction and in a second direction at right angles to the first direction, to enable tearing by hand along selected ones to the grid lines as a tear in a first direction, the sheet having individual perforations extending completely through its thickness, and located at the points of intersection of the axes of the lines of weakness. The perforations facilitate changes in the direction of a tear at a selected point of intersection, to extend the tear in the second direction, to achieve a desired size of sheet. The lines of weakness may further include tear lines extending diagonally between perforations, to facilitate changes in the direction of tearing, and to provide relieved corners to better fit into locations such as the corners of drawers, enclosed shelves, etc. The covering sheet may have an adhesive layer, such as a pressure sensitive adhesive on its reverse surface, and with the perforations extending also through the adhesive layer and through a release medium covering one face of the sheet. The perforations may comprise a reticulated series of through-cut microperforations arranged in oriented relation with the edges of the sheet. The release medium may be a removable sheet on the reverse face, covering the adhesive layer, or it may be applied in covering relation with the obverse face of the sheet when the covering sheet is supplied in rolled, self-wound form, usually upon a cardboard cylinder.

20 Claims, 4 Drawing Sheets

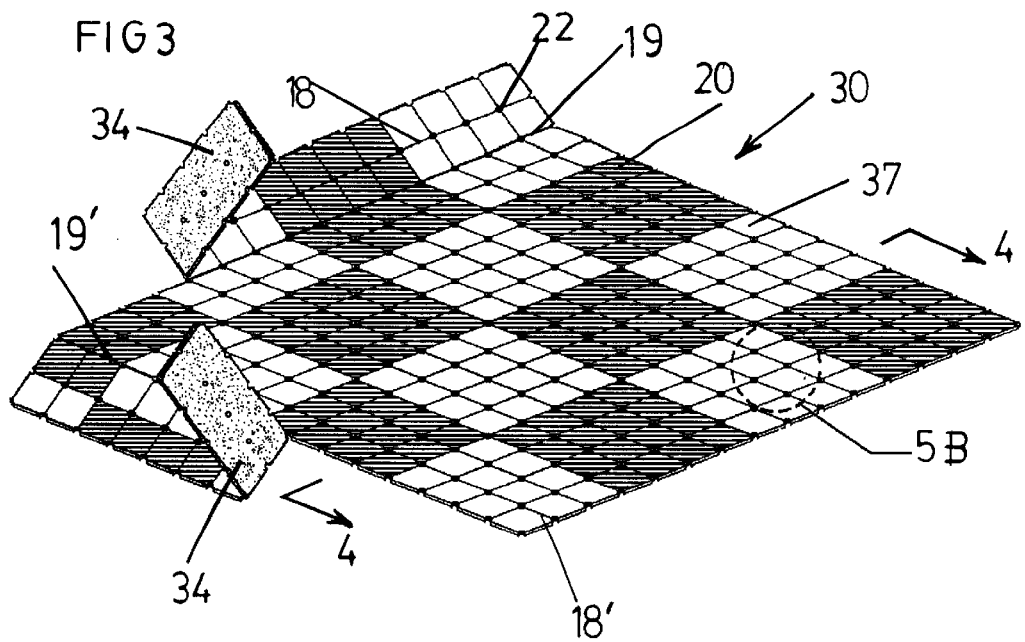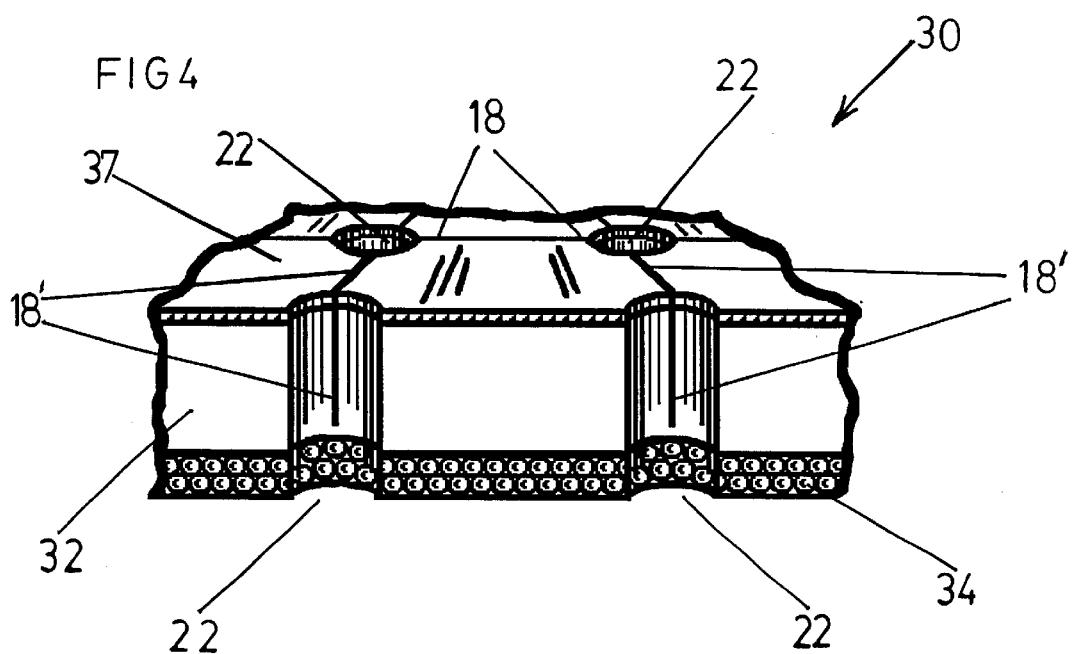

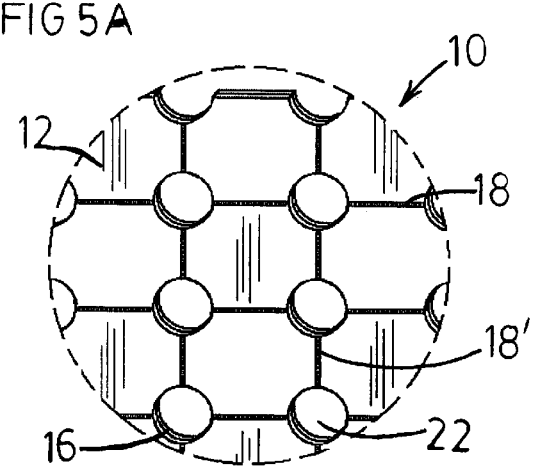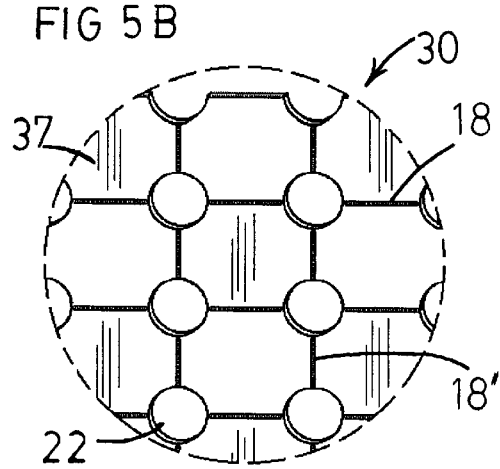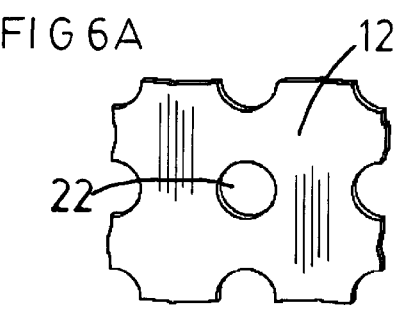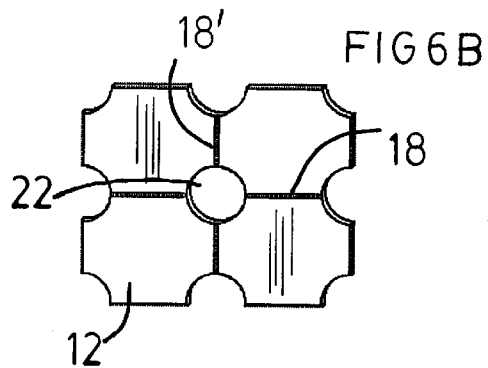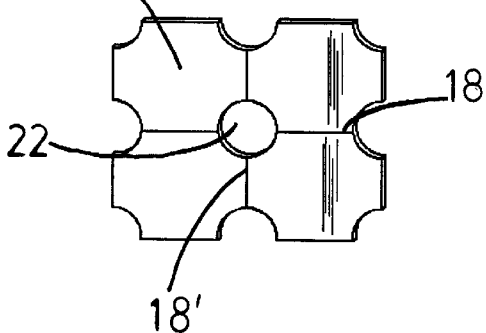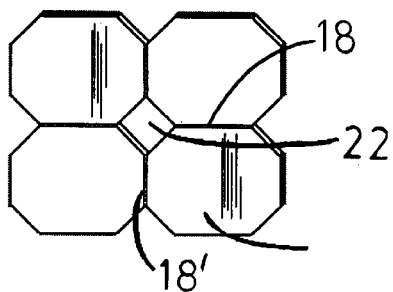

SELECTIVELY TEARABLE COVERING SHEET

BACKGROUND OF THE INVENTION

1. Field of the Invention

This invention is directed to a self adhesive decorative covering sheet adapted to conveniently facilitate hand-tearing to a predetermined reduced size. In particular, the covering sheet has been modified with reticulated through-cut microperforations and embossed prescores which are positioned to facilitate cross-tearing along the main, the transverse and diagonal axes of the sheet.

2. Description of the Prior Art

Widespread efforts have previously been made in the provision of sheet coverings, for application to selected surfaces in overlying protective or decorative relation. Much of this effort has been directed to covering sheets incorporating a first layer having a decorative first face, an intermediate layer of adhesive, and a reverse layer comprising a removable siliconized release liner.

Another provision known in the art includes a sheet having a siliconized decorative first face with an adhesive coated reverse face permitting the sheet to be rolled upon itself and readily unrolled without the need for a separable release liner.

This prior art includes the provision of hand-tearable sheets, having predetermined weakness characteristics to facilitate the ready downsizing of a standard sheet, in order to fit and cover a surface of predetermined size.

U.S. Pat. No. 4,380,564 Cancio et al, discloses decorative plastic sheet material intended for shelf liner and other uses, and provides for transverse and longitudinal hand tearing by use of transverse and longitudinal embossed intersecting tear lines, the tearing thereof being facilitated by the use of a dispersed phase of calcium carbonate (chalk) at about 15% of the mix, the plastic being low density polyethylene. In this patent, and their U.S. Pat. No. 4,465,729 the same inventors provide pressure sensitive adhesive protected by a removable liner. Installation of the materials disclosed in both of these patents is frequently cumbersome since the protective release liner backing the adhesive does not incorporate any tear assisting provision. Thus, in order to take advantage of their disclosed sheet tearing capability the prior removal of the release liner is virtually imperative. This can lead to severe problems, since the exposed adhesive surface tends to fold in upon itself, with extreme mutual adherence, the separation of which frequently leads to a permanently wrinkled covering sheet. Covering sheets having a dispersed chalk phase show a propensity to form a white fold line or break-through when creased, which is particularly noticeable in the case of sheets that are decoratively overprinted. Removal after long-term usage may be extremely difficult, due to sheet fragmentation into miniscule pieces, caused by aging embrittlement of the plastic by the calcium carbonate.

U.S. Pat. No. 5,536,546 Nash, discloses linerless labels, having the sheet of label material through-slit laterally and through-cut intermittently, longitudinally, with two sizes of cut, and with intermediate uncut tie portions, to define the individual labels. The slits and cuts are positioned such that the lateral slits each intersects a respective longer one of the longitudinal cuts, so as to provide a clean release of the respective label corners upon tearing. Adhesive and release backing are also provided.

U.S. Pat. No. 5,662,976 Popat et al, discloses laminated cards, for use with ink jet and laser printers, having a face sheet to receive printed material, a backing sheet and an adhesive over portions of the backing sheet, with microperforations that define the individual cards extending through the face sheet and the backing sheet. A release coating is provided over at least a portion of the adhesive.

In the prior art use of self adhesive covering sheets for shelves and the like it has usually been the practice to measure the surface to be covered, transfer the measurements to the outer face of the siliconized release liner along its preprinted gridlines, and cut along those gridlines, using scissors or a razor blade. It is troublesome to accurately achieve straight cuts and right angles along the length and width, in trimming a decorative covering sheet. The resultant inexactitude in sheet size and fit compounds the installation problem in fitting within a cabinet or drawer. Non-conforming or oversized material does not readily adhere precisely in its required location, having an increased tendency for sheet edges to cling to and seal to adjacent side walls of cabinets or drawers, and forming air pockets beneath the impermeable vinyl material. Such air pockets eventually collapse under load, forming unsightly and permanent creases and wrinkles.

The foregoing problems are intensified in the case of self wound liner material having the release coating applied to the decorative upper face. Such coverings frequently become unmanageable, when unrolled, since they are prone to folding upon themselves, with two adherent surface portions mutually engaging, and strongly adhering, leading to sheet deformation, with permanent creases being formed. Installation of this typo of liner requires the application of an oversized covering sheet to the surface to be covered, with folding up of the unrequired edge portions, and subsequent trimming away of the surplus with a razor blade. Since self-wound coverings are more difficult to position, especially within poorly accessed locations such as drawers and cabinets, the formation of air pockets and subsequent wrinkling becomes exacerbated. On occasion, users of both separable release lined and self wound covering sheets are known to puncture the decorative and/or protective impermeable outer layer to release entrapped air, thus mutilating the covering sheet.

SUMMARY OF THE INVENTION

The present invention provides a covering sheet for applying to a selected surface in substantially fitted, covering relation therewith, and consisting of a flexible sheet of predetermined size and thickness and having a rectangular grid of lines to provide rectilinear yield lines (lines of weakness) extending in a first direction and in a second direction at right angles to the first direction, to enable tearing by hand along selected ones of the grid lines as a tear in a first direction, the sheet having individual perforations extending through the thickness thereof at the points of intersection of the axes of the lines of weakness, the perforations facilitating changes in the direction of a tear at a selected point of intersection, to extend the tear in the second direction, to achieve a desired size of sheet.

The covering sheet according to the invention may have through-cut reticulated microperforation, the network of which is oriented in relation to the edges of the sheet. The lines of weakness may further include lines extending diagonally between perforations, to facilitate changes in the direction of tearing, and to provide relieved corners to better fit into locations such as the corners of drawers, enclosed shelves, etc.

The covering sheet may have an adhesive layer, such as a layer of pressure sensitive adhesive applied to the reverse surface thereof, and with the perforations extending also through the adhesive layer.

The covering sheet in most instances includes a release medium covering one face of the sheet, for engagement by the pressure sensitive adhesive layer.

In one embodiment the covering sheet has the release medium applied as a removable sheet to the reverse face, in covering relation with the pressure sensitive adhesive layer. In another embodiment the covering sheet has the release medium applied in covering relation with the obverse face of the sheet, in use to receive the pressure sensitive layer in self-wrapped, releasably secured overlying relation with the release medium, such as when the covering sheet is supplied in rolled form, usually upon a cardboard cylinder, wherein the adhesive reverse face adheres to the adjoining, underlying surface of release medium. The covering sheet lines of weakness are relieved into the surface of the flexible sheet. The covering sheet relieved lines may have a transverse dimension in the range 0.005 to 0.015 inches.

The covering sheet is preferably uniformly perforated with the through-cut reticulated microperforations, having a concentration in the range of about 400 to 900 holes per square inch. An embodiment with sheet perforations having a concentration in the range of about 625 to 729 holes per square inch his preferred. A perforation value of 729 holes per square inch (26×26) provides tear lines spaced substantially 1/27 inches apart; i.e. 0.037 inch pitch centers.

The sheet perforations may have a diameter in the range of about 0.0075 to 0.010 inches. The covering sheet through-perforations may be circular, or they may have an angular shape selected from the group consisting of rectangular, square, rhomboid, star and diamond shapes. In the non-circular perforation arrangement, the sheet perforations may have the diametrically opposed corners of the perforations in aligned relation with the grid lines, to promote tearing of the sheet in the first and in the second direction. In such an arrangement the sheet perforations may be spaced at least about 0.035 inches apart.

The covering sheet relieved grid lines are prescored, usually being discontinuous, the segmented prescored grid lines having segment lengths of about 0.040 inches long. The segmented grid lines may include cross-sectional shapes selected from the group consisting of embossed shaped sections; sinusoidal grooves and lineal cuts, extending only partway through the thickness of the face sheet.

The face sheet, preferably of single phase, homogeneous plastic, may consist of a substrate selected from the group consisting of polymers and copolymers, including polyvinyl chloride, polypropylene, polyethylene, and polyester. The backing adhesive may be pressure sensitive, having the perforations extending through both it and the silicone treated release layer, for unimpeded manual tearing of the covering sheet. The use of decorative paper or non-woven textile as the viewable, face sheet material is also contemplated, within the scope of the present invention.

In the case of self-wound cover sheets, the obverse face is coated with a siliconized release material, the use of an ultra violet cured polysiloxane release coating is contemplated for this purpose.

It will be understood that the subject cover sheets may be applied in a non-adhering condition, with its release backing sheet remaining in secured relation, wherein the through-cut microperforations enable ready hand-sizing of the sheet, and the through-cut perforations enable the sheet to "breath", so as to obviate air bubble entrapment.

The subject covering sheets may be perforated by passage thereof through a roll nip, wherein one roll has a pattern of perforations over its cylindrical periphery, and the facing roll has a corresponding pattern of projecting pins positioned to enter the respective perforations, the nip of the rolls being sized to the thickness of the covering sheet. The microperforated and line-scored covering sheet is then cooled by way of a chiller roll or by application of cold air. The perforated roll may be a vacuum roll, to evacuate the punchings. The relieved grid lines may be applied by way of the perforating rolls, wherein an intermittent line pattern is embossed upon the surface of the facing roll, between the pins. The miniscule embossments may be applied to the surface of the roll by way of radio frequency or ultrasonic welding deposition.

It is contemplated that engraving blades may be substituted for the embossment pattern, forming linear scores ("kiss-cuts") extending only partway through the thickness of the plastic substrate. It is further contemplated that the micro-perforations may also be applied by way of a platen step-die, with repeated applications, or by laser perforation.

In use, in applying a torn-to-size covering sheet in adhering relation with a shelf or other surface, the presence of the through-perforations, extending through the full thickness of the covering sheet provides permeability, permitting the escape of air from beneath the covering sheet, to thereby substantially preclude the formation of unsightly air bubbles, and facilitate the smooth lay of the covering sheet. The closely spaced perforations and associated surface relief of scored grid lines permit ready tearing by hand of the material, to provide a covering sheet snugly tailored to substantially any shelf or drawer area.

While the plastic substrate may be color finished or pattern-printed, the use of transparent film also is contemplated, for use in covering wood grained or other decorative surfaces, to leave the natural wood beauty visually unobstructed, while protecting its surface.

The adherent surface may comprise rupturable acrylic pressure sensitive adhesive microspheres, to facilitate repositioning. Such microspheres tend to inhibit the build-up of adhesive tack, thus facilitating removal, even after long usage. Alternatively, conventional acrylic or rubber-based pressure sensitive adhesive may be used. All adhesives are applied in a conventional fashion.

The reverse (non-decorative) face of the covering sheet outer layer may be coated with the adhesive, such as a water-based (repositionable) acrylic, having a siliconized release medium, such as paper or plastic in isolating, protective relation thereover. The release medium can be applied last, or alternatively, the adhesive may first be deposited upon the surface of the release medium, and then applied under pressure to the reverse face of the covering sheet outer layer.

The release medium, in the form of a clear, siliconized coating, may be applied to the obverse, upper face of the covering sheet, where it makes contact with, and protects the adhesive reverse face when the sheet is self-wound onto a supporting cardboard cylinder. While the majority of the prior art covering sheets have incorporated an adhesive backing, it will be understood that certain aspects of the invention may be applied to a non-adhesive covering sheet.

BRIEF DESCRIPTION OF THE DRAWINGS

Certain embodiments of the invention are described by way of illustration, without limitation thereto other than as set forth in the accompanying claims, reference being made to the accompanying drawings, wherein:

FIG. 3 is a view corresponding to FIG. 1 of a second embodiment having a release agent on the upper surface and an opposite preferred adherent surface of rupturable acrylic pressure sensitive adhesive microspheres;

FIG. 4 is an enlarged perspective cross-section taken at 4—4 of FIG. 3;

FIG. 5A is an enlarged detail of portion 5A of FIG. 1, showing embossed score lines;

FIG. 5B is an enlarged detail of portion 5B of FIG. 3, with embossed score lines;

FIG. 6A is an enlarged detail of a portion of a microperforated covering sheet, having circular section perforations;

FIG. 6B is a view similar to FIG. 6A, including relieved grid lines, by embossment;

FIG. 6C is a view similar to FIG. 6B, with grid lines engraved by cutters;

FIG. 6D is a view similar to FIG. 6C, with diamond shaped mini perforations;

DETAILED DESCRIPTION OF THE INVENTION

Figure 1:
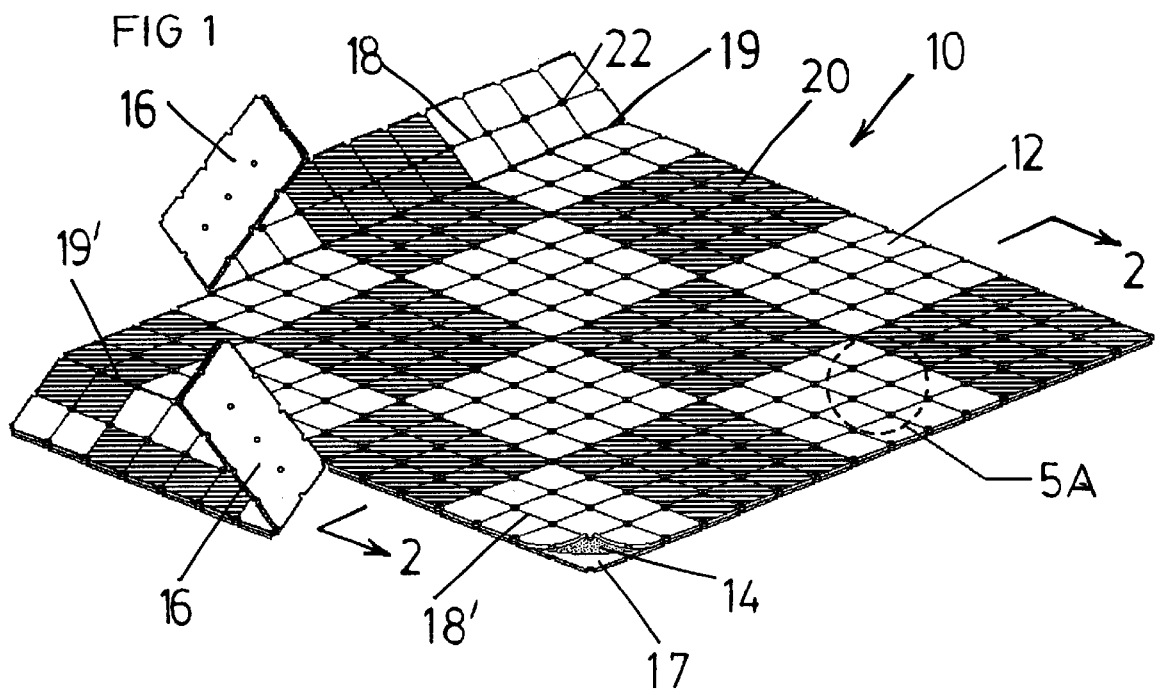
FIG. 1 is a top-front perspective view (much enlarged) of a portion of a covering sheet in accordance with the present invention, having a release liner undersheet backing and showing torn margin portions.
Figure 2:
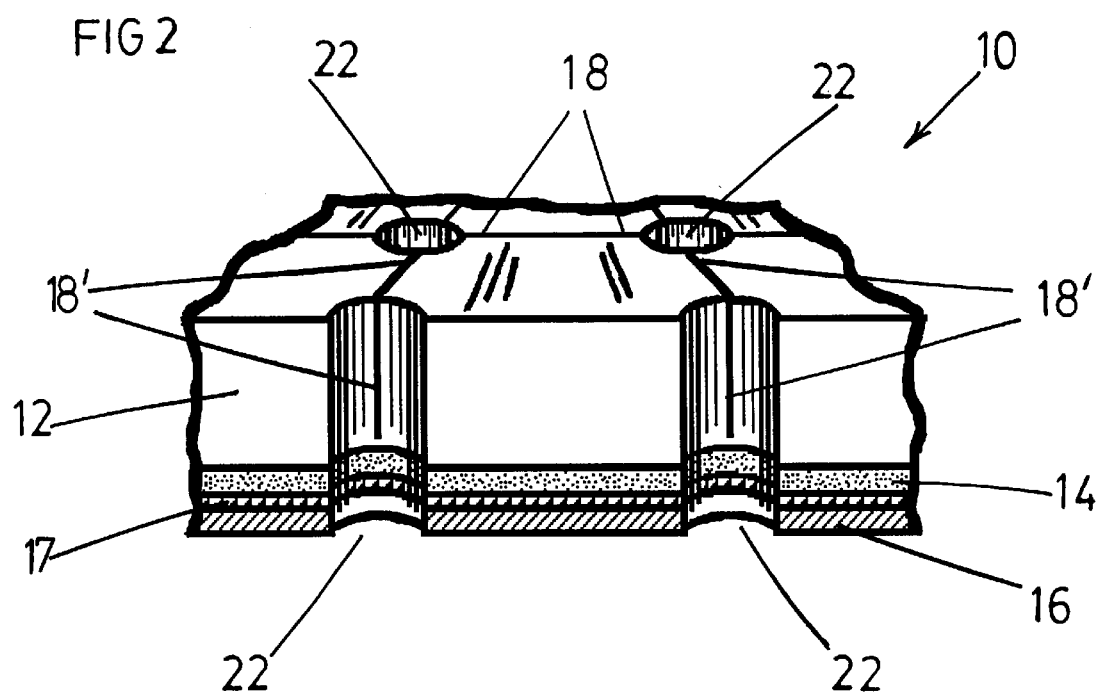
FIG. 2 is an enlarged perspective cross-section taken at 2—2 of FIG. 1.

Referring to FIGS. 1 and 2, a small portion 10 of a covering sheet in accordance with the present invention consists of a plastic outer sheet 12, an adhesive layer 14, and a backing release paper 16 secured in protective relation with the adhesive layer 14. The release paper 16 has a top surface comprising a silicone layer 17, which abuts the adhesive layer 14. The outer sheet 12 may be decorative consisting of homogeneously colored plastic or may be surface printed with various types of indicia 20.

One side edge portion and a bottom edge portion of the sheet portion 10 are illustrated as being partially torn along grid lines 19,19'. The grid lines 19,19' consist of relieved lines of weakness, consisting of a series of intermittent scored narrow and shallow grooved lines 18,18' alternating with microperforations 22. The microperforations 22 may be located at the intersections of the axes of the scored lines 18. The scored lines 18 extend only partially through the thickness of the outer sheet 12, whereas the microperforations 22 extend through the total thickness of the sheet portion 10, inclusive of the adhesive layer 14 and the release paper 16. Due to the close spacing of the relieved lines 18 and associated grid series of microperforations 22, ready hand tearing of the covering sheet to a desired smaller size is practical, within close limits of size.

Turning to the FIGS. 3 and 4 embodiment, a covering sheet portion 30 has a plastic sheet 32 whose obverse face is coated with a silicone release medium 37, and whose converse face is layered with a rupturable acrylic microsphere adhesive 34. The sheet 32 may be decorative consisting of homogeneously colored plastic or may, prior to the application of a silicone release medium 37, be surface printed with various types of indicia 20. The grid lines 18 and 18' of the covering sheet 32 are engraved or scored, and extend completely through the release medium 37 and only partially through the plastic sheet 32. One side edge portion and a bottom edge portion of the sheet portion 30 are illustrated as being partially torn along grid lines 19,19'. The grid lines 19,19' consist of relieved lines of weakness, consisting of a series of intermittent engraved or scored grid lines 18,18', alternating with microperforations 22, as for the FIG. 1 embodiment.

Turning to the further enlarged illustrations of microperforations 22 shown in FIGS. 5A–6D, FIGS. 5A shows the elements of FIG. 1, FIG. 5B shows the elements of FIG. 3.

FIG. 6A shows an embodiment having only the microperforations 22. FIG. 6B shows a plastic substrate such as vinyl, having grid lines 18,18' that are an embossed prescore.

In FIG. 6C, the grid lines 18, 18' are knife-engraved, as so-called "kiss-cuts". The FIG. 6D embodiment has rectangular microperforations 22, positioned diamond-wise, with the corners of the rectangle aligned with the gridlines 18, 18', to facilitate tearing along either axis of the grid.

Figure 7:
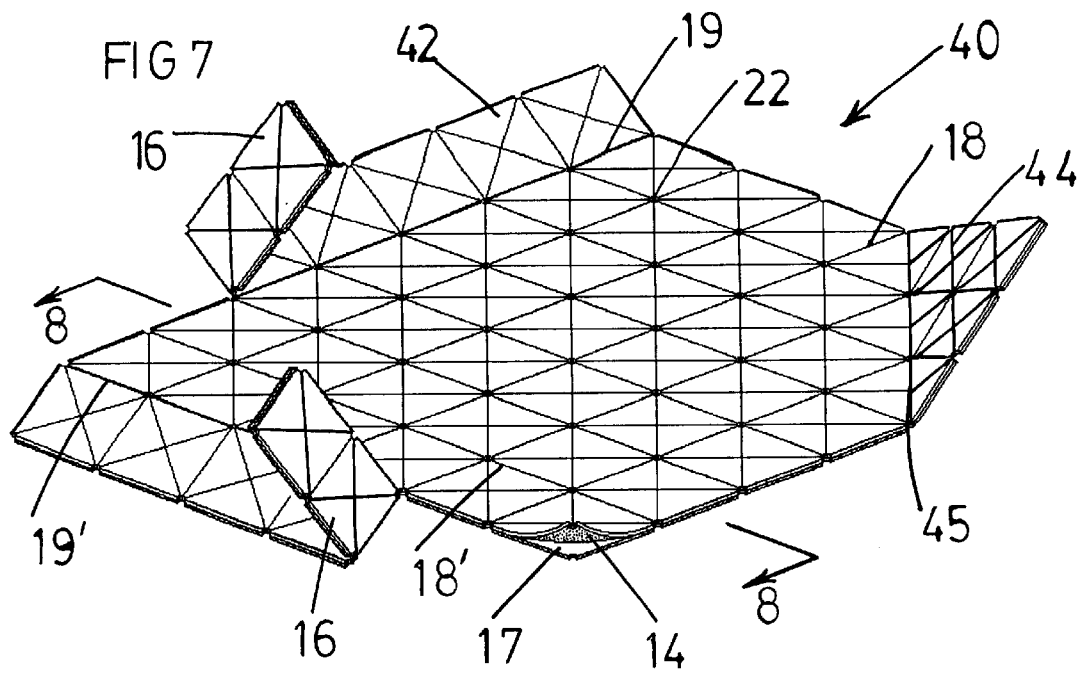
FIG. 7 is a view similar to FIG. 1 of an embodiment incorporating diagonal tear lines.
Figure 8:
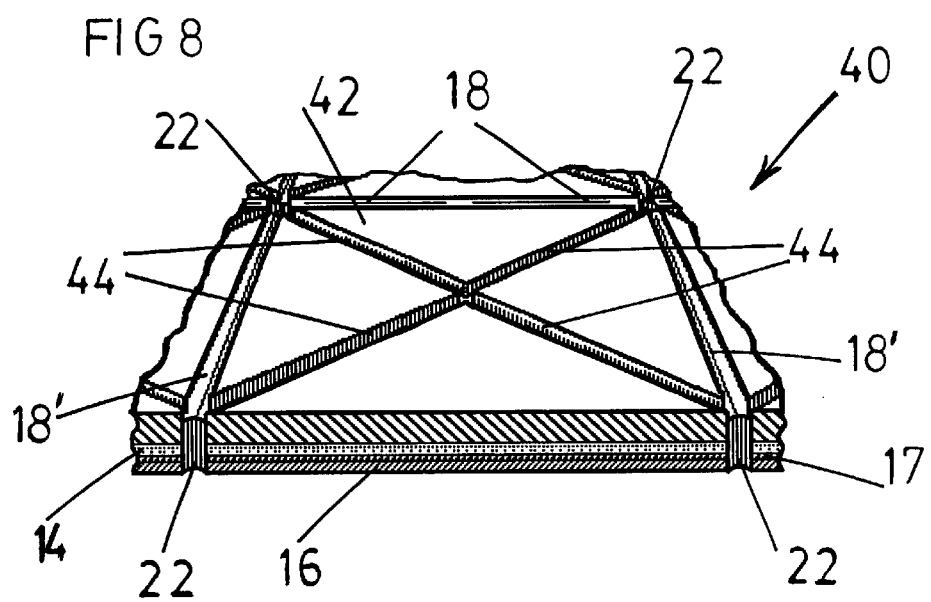
FIG. 8 is a view similar to FIG. 2, taken at 8—8 of FIG. 7.

In the FIGS. 7 and 8 embodiments, a small portion 40 of a covering sheet in accordance with the present invention consists of a plastic outer sheet 42, an adhesive layer 14, and a backing release paper 16 secured in protective relation with the adhesive layer 14. The release paper 16 has a top surface comprising a silicone layer 17, which abuts the adhesive layer 14.

One side edge portion and bottom edge portion of the sheet portion 40 are illustrated as being partially torn along grid lines 19,19'. The grid lines 19,19' consists of a series of intermittent scored narrow and shallow grooved lines 18, 18' that extend partially through the plastic outer sheet 42, and alternate with through cut microperforations 22 located at the intersections of the axes of the scored lines 18, as for the FIG. 1 embodiment. Diagonal yield lines 44 comprising grooved or engraved (knife cut) rectilinear relief lines, extend diagonally in aligned relation with the microperforations 22, and intersect each other. Use of the diagonal yield lines 44 is illustrated in the raised sheet portion shown with the crease 45, as at the right corner of the FIG. 7 embodiment.

What is claimed is:

1. A covering sheet for applying to a selected surface in substantially fitted relation therewith, and consisting of a flexible sheet of predetermined size and thickness and having a rectangular grid of lines to provide rectilinear grid lines of weakness extending in a first direction and in a second direction at rightangles to said first direction, to enable tearing by hand along selected ones of said grid lines as a tear in a first said direction, said sheet having perforations through the thickness thereof at the points of intersection of said lines, said perforations facilitating changes in the direction of a said tear at a selected point of intersection, to extend said tear in said second direction, to achieve a desired size of sheet, and relieved tear lines in said sheet obliquely inclined to said grid lines to enable the hand tearing of corner chambers on said sheet.

2. The covering sheet as set forth in claim 1, said grid lines of weakness being relieved into the surface of said flexible sheet.

3. The covering sheet as set forth in claim 2, said relieved grid lines being prescored.

4. The covering sheet as set forth in claim 3 said prescored grid lines being segmented, and having segment lengths of about 0.040 inches long.

5. The covering sheet as set forth in claim 4, said segmented grid lines being selected from the group consisting of embossed shaped sections; sinusoidal grooves and lineal cuts, and extending only partway through said sheet thickness.

6. The covering sheet as set forth in claim 2, said perforations having a transverse dimension in the range 0.005 to 0.015 inches.

7. The covering sheet as set forth in claim 2, said covering sheet having a layer of pressure sensitive adhesive applied to the reverse surface thereof, said perforations extending through said pressure sensitive layer.

8. The covering sheet as set forth in claim 7, including a release medium covering one face of said sheet, for attachment to said pressure sensitive adhesive layer.

9. The covering sheet as set forth in claim 8, said release medium being applied to said reverse face, in covering relation with said pressure sensitive adhesive layer.

10. The covering sheet as set forth in claim 8, said release medium being applied in covering relation to the obverse face of said sheet, in use to receive said pressure sensitive layer in self-wound, releasably secured overlying relation with said release medium.

11. The covering sheet as set for in claim 7, said pressure sensitive adhesive consisting of rupturable acrylic pressure sensitive adhesive microspheres, to facilitate removal and repositioning of said covering sheet.

12. The covering sheet as set forth in claim 7, said pressure sensitive adhesive consisting of conventional pressure sensitive adhesive selected from the group consisting of acrylic and rubber-based pressure sensitive adhesive.

13. The covering sheet as set forth in claim 1, said sheet perforations having a concentration in the range of about 400 to 900 holes per square inch.

14. The covering sheet as set forth in claim 1, said sheet perforations having a concentration in the range of about 625 to 729 holes per square inch.

15. The covering sheet as set forth in claim 1, said sheet perforations having a diameter in the range of about 0.0075 to 0.010 inches.

16. The covering sheet as set forth in claim 1, said sheet perforations having an angular shape selected from the group consisting of rectangular, square, rhomboid, star and diamond shapes.

17. The covering sheet as set forth in claim 16, said sheet perforations having diametrically opposed corners of said perforations in aligned relation with said grid lines to promote tearing of said sheet in said first and in said second direction.

18. The covering sheet as set forth in claim 1, said sheet perforations being spaced at least about 0.035 inches apart.

19. The covering sheet as set forth in claim 1, said sheet consisting of a plastic substrate selected from the group consisting of polymers and copolymers, including polyvinyl chloride, polypropylene, polyethylene, and polyester.

20. A covering sheet for application to a selected surface, in substantially fitted, covering relation therewith, and consisting of a flexible sheet of predetermined size and thickness and having a grid pattern consisting of short rectilinear line segments relieved into the surface of said flexible sheet; and a series of through-cut microperforations located at points of intersection of said grid pattern and forming with said line segments lines of weakness, said lines of weakness being in oriented relation with the edges of said sheet, to enable selective tearing of said sheet to a substantially predetermined size and shape, said through-cut perforations providing porosity to said sheet, to facilitate the laying of said sheet upon a surface while substantially obviating the entrapment of air bubbles between said sheet and said surface.

* * * * *